April 21, 1925.  
G. HILL  
VARIABLE CONDENSER  
Filed Feb. 3, 1923  
1,534,213  
2 Sheets-Sheet 1

Inventor  
Guy Hill  
By Robert Young Attorney

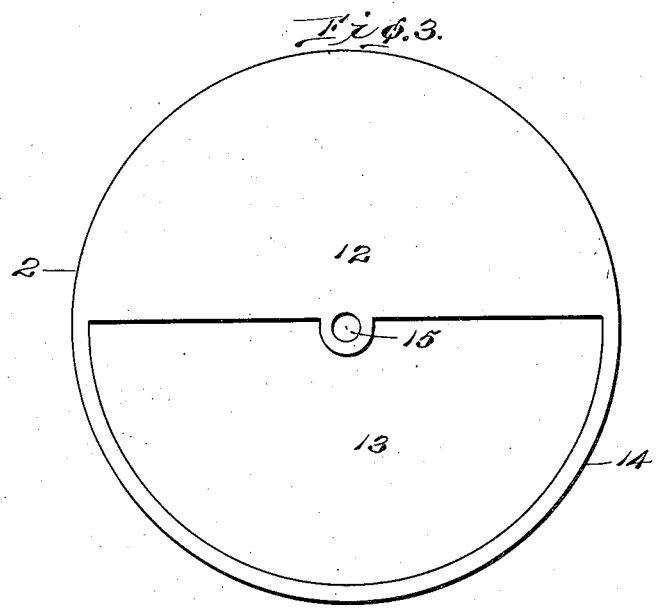
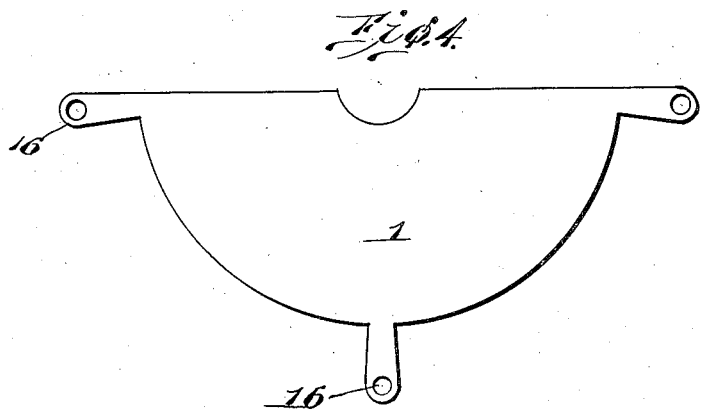

Patented Apr. 21, 1925.

1,534,213

UNITED STATES PATENT OFFICE.

GUY HILL, OF WASHINGTON, DISTRICT OF COLUMBIA.

VARIABLE CONDENSER.

Application filed February 3, 1923. Serial No. 616,759.

*To all whom it may concern:*

Be it known that I, GUY HILL, a citizen of the United States, residing at Washington, in the District of Columbia, have invented certain new and useful Improvements in Variable Condensers, of which the following is a specification.

This invention relates to an improved construction of a variable condenser.

The main object of the invention is to construct a variable condenser in which the movable plates are held in fixed planes, keeping the vertical distances between the fixed and movable plates invariable. This feature is of importance and value in variable condensers, making it possible to maintain a fixed calibration of the condenser.

In the present method of condenser construction, the movable plates are generally supported only at the center and it is very difficult to maintain the movable plates in fixed planes with relation to the fixed plates, and this causes changes in capacity of the condenser. Also, if the separations between the fixed plates and the movable plates are small, the plates are apt to touch, causing a short circuit of the condenser. In this invention a method for mounting the movable plates is described whereby these defects are eliminated. The method of accomplishing the result can be best understood by reference to the accompanying drawings:

Figure 3 is a detailed drawing of a single movable plate.

Figure 4 is a detailed drawing of a single fixed plate.

Figure 1:
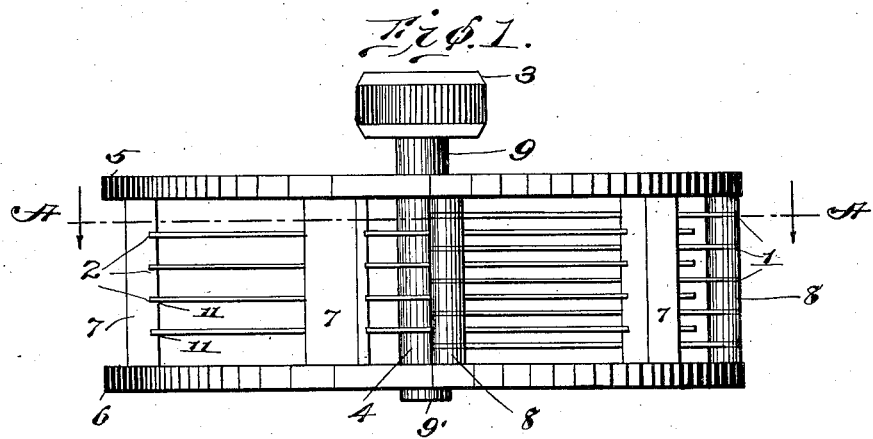
Figure 1 is an elevation view of the condenser.
Figure 2:
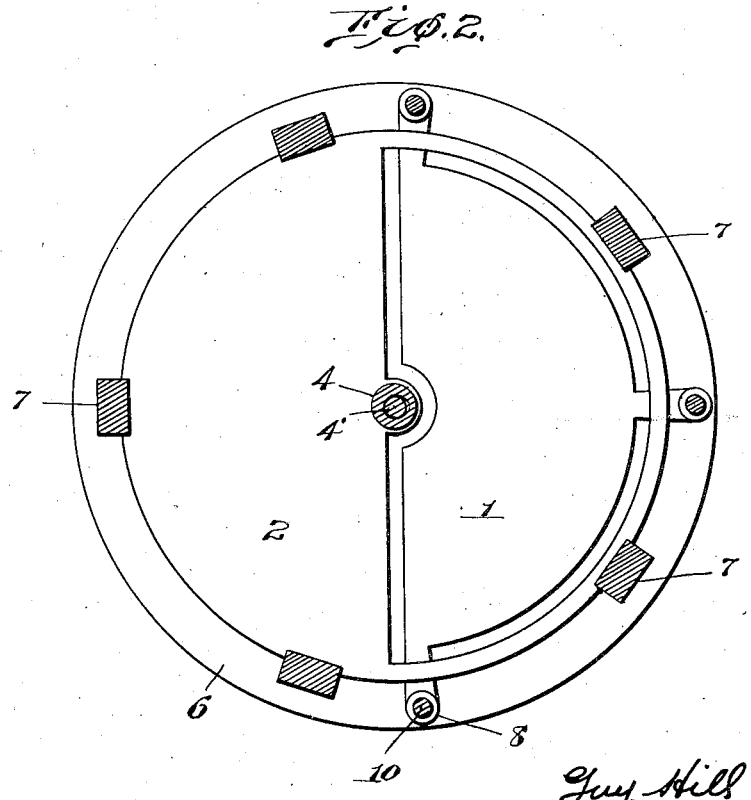
Figure 2 is a sectional view of the condenser through the line AA of Figure 1.

Having particular reference to the drawings in which like numerals designate similar parts in Figure 1, 1 represents the fixed plates of the condenser; 2 designates the movable plates which are mounted on a shaft $4^1$, which is inclosed in separators 4 and not specifically shown in Figure 1, but indicated in Figure 2. These movable plates 2 are supported at the circumference by guide posts 7, these guide posts having suitable slots or recesses so that the movable plates can turn freely through these slots and at the same time be maintained in a definite plane with relation to the fixed plates. The fixed plates 1 are supported on rods 10 having suitable spacing elements 8 mounted on the rods 10. Also spacing elements 4 mounted on the shaft $4^1$ to keep the separation between the movable plates 2 and fixed plates 1. 3 is a suitable knob for rotating the plates. It is understood, of course, that the separating elements 4 on the shaft and the separating elements 8 on the rods 10 are held in fixed position by any means adopted suitable for that purpose, and are also supported at the extreme ends by the end plates 5 and 6. A suitable method described in detail for holding the spacing elements in proper position is given in my Patent 1408738, issued March 7, 1922.

Figure 2: 7 shows sectional view of the rods which support the movable plates, also shows a sectional view of the rods 10 on which the fixed plates are mounted.

The forms of the plates are shown in Figures 3 and 4.

In Figure 3 a movable plate is shown which is formed by taking a circular disk of metal and cutting out a part of one half of its area, indicated by 13 in the diagram. Thus the movable plate consists of a half circle indicated by 12 and the other half circle, having an annulus, indicated by 14. The object of this is so that the whole circumference of the plate at several points could be guided by revolving in suitable slots in posts 7. 15 is a hole in the plate 12 for mounting it on the shaft $4^1$.

Figure 4 shows a detailed view of the fixed plate, which is in the form of a semicircle with several extensions indicated by 16 for mounting the plate.

I claim:

1. In a variable condenser the combination of a plurality of alternately arranged stationary and movable plates, a central shaft, said movable plates having their centers maintained a fixed distance apart by suitable attachment to said central shaft and having their peripheries maintained the same fixed distance apart by peripheral supporting elements, said movable plates being free from mechanical contact with said interleaving stationary plates, the dielectric between said plates consisting entirely of air, said central shaft being provided with means for rotating said movable plates.

2. In a variable condenser, the combination of a plurality of stationary and movable plates alternately arranged with respect to each other, a centrally disposed shaft for rotating said movable plates, spacing members mounted on said shaft for centrally spacing said plates, each of said movable plates being circular and having a cut-out portion substantially coextensive with the main body portion of each of said stationary plates, a plurality of peripheral spacing members to support and space the entire periphery of said movable plates, a plurality of exterior spacing members for said stationary plates.

3. In a variable condenser, the combination of a plurality of stationary and movable plates alternately arranged with respect to each other, a centrally disposed shaft for rotating said movable plates, spacing members mounted on said shaft for centrally spacing said plates, each of said movable plates being circular and having a cut-out portion substantially coextensive with the main body portion of each of said stationary plates, a plurality of peripheral spacing members to support and space the entire periphery of said movable plates, said stationary plates having laterally extending projections, a plurality of exterior spacing members adapted to receive said projections and space said stationary plates.

4. In a variable condenser, the combination of a plurality of stationary and movable plates alternately arranged with respect to each other, a centrally disposed shaft for rotating said movable plates, spacing members mounted on said shaft for centrally spacing said plates, each of said movable plates being circular and having a cut-out portion substantially coextensive with the main body portion of each of said stationary plates, a plurality of peripheral spacing members to support and space the entire periphery of said movable plates, a plurality of exterior spacing members for said stationary plates, the air space between said plates forming the dielectric and constituting the only insulation intermediate of said plates.

In testimony whereof I affix my signature.

GUY HILL.